UNITED STATES PATENT OFFICE.

ERNEST G. SCOTT, OF PORT SUNLIGHT, NEAR BIRKENHEAD, ENGLAND, ASSIGNOR TO LEVER BROS., OF SAME PLACE.

PROCESS OF MAKING CARBON TETRACHLORIDE.

SPECIFICATION forming part of Letters Patent No. 435,862, dated September 2, 1890.

Application filed June 29, 1889. Serial No. 316,058. (No specimens.)

*To all whom it may concern:*

Be it known that I, ERNEST GEORGE SCOTT, chemist, of Port Sunlight, near Birkenhead, in the county of Chester, England, have invented certain new and useful Improvements in the Manufacture of Tetrachloride of Carbon, of which the following is a specification.

This invention is designed as a cheap and effective method of obtaining practically pure carbon tetrachloride. This compound has hitherto been usually obtained by the action of chlorine on chloroform or on carbon bisulphide. In the latter case chlorine saturated with carbon bisulphide by passing through that liquid is made to pass through a red-hot tube, a mixture of carbon tetrachloride and sulphur chloride results, and the latter is separated from the former by agitation with potash lye or milk of lime. By this process the tetrachloride is almost certain to be contaminated with carbon bisulphide, and requires for its purification an expensive refining process. Now I obtain the tetrachloride from carbon bisulphide in a much cheaper and simpler manner, as follows: Dry chlorine is passed slowly into carbon bisulphide, in which is dissolved twelve per cent. of its weight of iodine, the chlorine-delivery tube being perforated with very small openings. The gas is completely absorbed with generation of heat, the temperature being kept at from 90° Fahrenheit at beginning to 120° Fahrenheit at the end, a reflux condenser being attached to absorption-vessel to avoid loss, forming carbon tetrachloride and sulphur chloride, the iodine acting simply as a carrier of chlorine. $CS_2 + 3Cl_2 = CCl_4 + S_2Cl_2$. When one hundred volumes of carbon bisulphide have increased to three hundred volumes, the reaction is stopped and the product is slowly distilled. The tetrachloride boiling at 78° passes over first with the iodine, leaving the sulphur-chloride boiling-point 138° in the still. The tetrachloride is refractionated and shaken with caustic soda or potash lye to remove the iodine and the last portions of sulphur chloride. The tetrachloride is then redistilled and so obtained in a state of purity. The sodium-iodide solution is filtered free from sulphur, concentrated, and treated with sulphuric acid and chlorine to set free the iodine, which is then removed from the aqueous solution by shaking with carbon bisulphide. The solution of iodine in bisulphide is then used in the main reaction.

I declare that what I claim is—

1. The process of making carbon tetrachloride, which consists in passing dry chlorine gas slowly through carbon bisulphide and iodine, separating the carbon bisulphide and carbon tetrachloride, which is formed from the sulphur chloride by distillation, whereby the sulphur chloride is left in merchantable form, then refractionating the tetrachloride and treating it with caustic alkali to remove the iodine, and redistilling, filtering, and concentrating the solution of alkaline iodide resulting from the previous step, agitating it with carbon bisulphide, and using the resulting solution of iodine in carbon bisulphide for the first step in the process.

2. The improvement in the process of obtaining carbon tetrachloride by means of chlorine gas, bisulphide of carbon and iodine, which consists in passing the chlorine gas into the carbon bisulphide and iodine, and then fractionally distilling the resultant mass, whereby the tetrachloride is separated from the bichloride of sulphur without decomposing the latter, the bichloride being thus left as a valuable by-product.

3. The improvement in the process of making tetrachloride of carbon by means of chlorine gas, which consists in forming the tetrachloride by passing chlorine into iodine and bisulphide of carbon, fractionally distilling off the iodine and tetrachloride, and separating the tetrachloride by means of caustic-alkali lye.

4. The improvement in the process of obtaining carbon tetrachloride by passing chlorine through iodine and bisulphide of carbon and by fractional distillation, which consists in separating the iodine by means of caustic alkali; concentrating the aqueous solution of iodine thus formed, treating it with a strong mineral acid and chlorine to set free the iodine, and extracting the resulting free iodine by agitating it with a bisulphide of carbon, whereby a resulting mixture or compound of sulphide of carbon and iodine is produced suitable for use in the first step of the process.

In testimony whereof I have signed my name to this specification in the presence of two subscribing witnesses.

ERNEST G. SCOTT.

Witnesses:
JOSEPH J. RONDEN,
H. P. SHOOBRIDGE.